H. L. WADE.
TRACTION ENGINE.
APPLICATION FILED FEB. 4, 1915.
1,232,629.
Patented July 10, 1917.
2 SHEETS—SHEET 1.
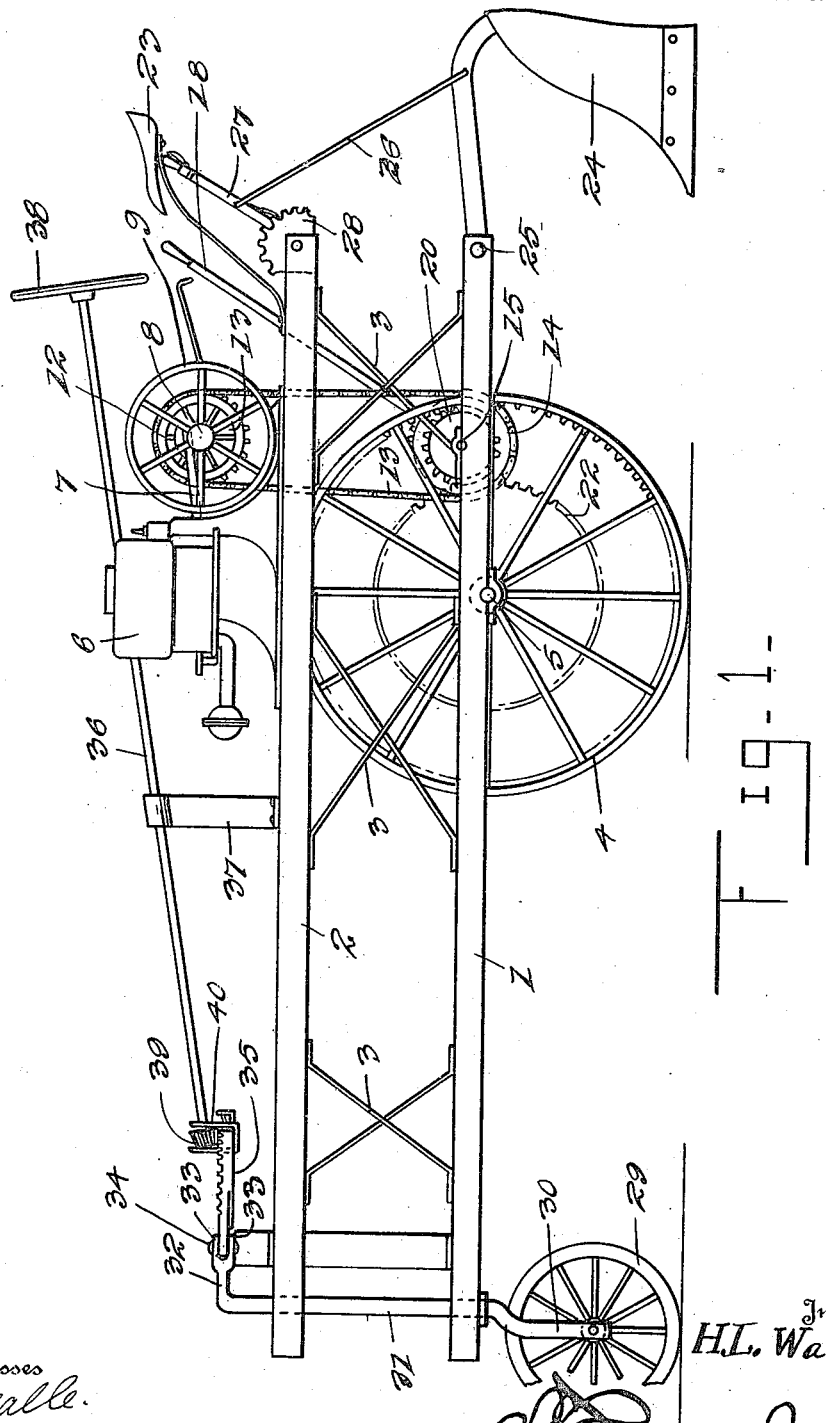

H. L. WADE.
TRACTION ENGINE.
APPLICATION FILED FEB. 4, 1915.
1,232,629.
Patented July 10, 1917.
2 SHEETS—SHEET 2.
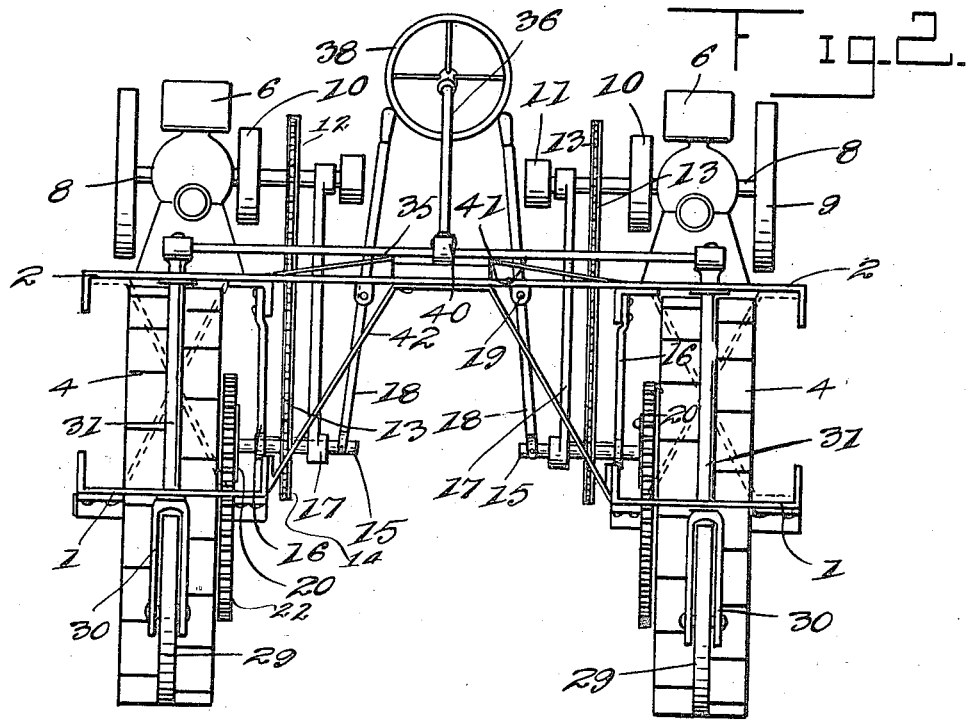
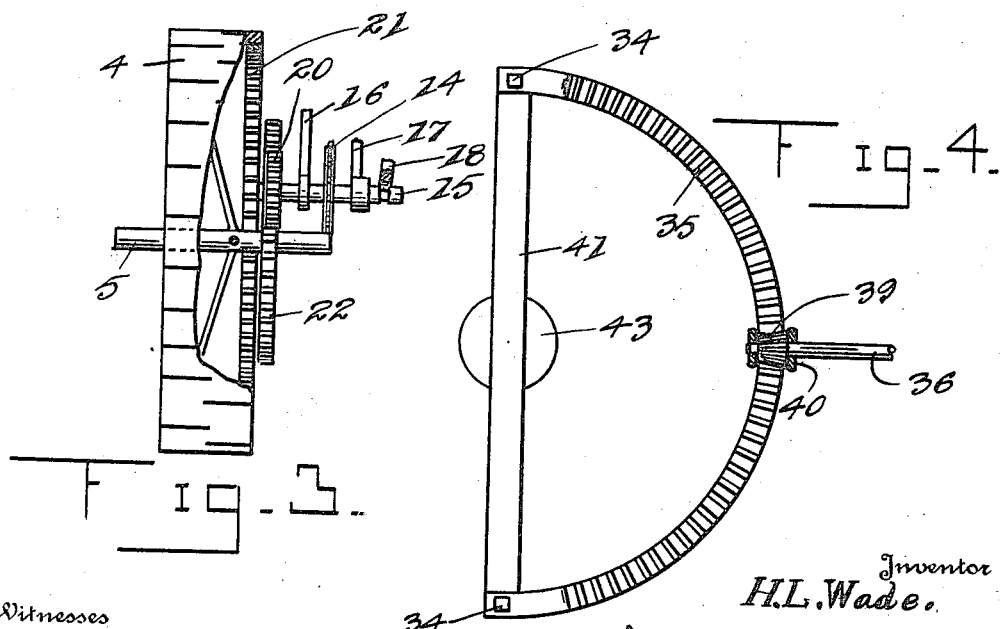
Witnesses
Inventor
H. L. Wade.
By
Attorney

UNITED STATES PATENT OFFICE.

HARRY L. WADE, OF BIGHEART, OKLAHOMA.

TRACTION-ENGINE.

1,232,629.  Specification of Letters Patent.  Patented July 10, 1917.

Application filed February 4, 1915.  Serial No. 6,096.

*To all whom it may concern:*

Be it known that I, HARRY L. WADE, a citizen of the United States, residing at Bigheart, in the county of Osage and State of Oklahoma, have invented certain new and useful Improvements in Traction-Engines; and I do hereby declare the following to be a full, clear, and exact description of the invention, such as will enable others skilled in the art to which it appertains to make and use the same.

This invention relates to traction engines, designed more particularly for use on farms, and one of the principal objects of the invention is to provide a farm vehicle in which the traction wheels are independently operated by separate motors so that the vehicle may be turned within its length, in either a forward or backward direction.

Another object of the invention is to provide a traction engine in which each of the traction wheels are provided with a motor located upon a frame immediately above the traction wheel and each of said motors being independently operated for each traction wheel, and simple means for directing the movement of the vehicle.

Still another object of the invention is to provide a motor vehicle for doing various kinds of work about a farm and which can be easily managed and which will be well adapted for side hill work.

These and other objects may be attained by means of the construction illustrated in the accompanying drawings, in which:

Figure 1 is a side elevation of a traction engine made in accordance with this invention;

Fig. 2 is a front elevation of the same;

Fig. 3 is a view in elevation of one of the traction wheels and its operating parts, the wheel being broken away upon one side;

Fig. 4 is a top plan view of the steering gear.

Referring to the drawings, the numerals 1 and 2 designate the longitudinal frame bars of the engine, said frame bars being preferably formed of angle iron and braced at suitable distances apart vertically by means of the cross braces 3. Journaled underneath the frame bars 1 toward the rear of the vehicle are the traction wheels 4 mounted on the stub axle 5. Supported upon the upper bars 2 of the frame and substantially in alinement with the vertical centers of the wheels 4 are separate motors 6.

These motors are preferably of the internal combustion type to be operated by gasolene. A pair of crank shafts 8 each one associated with one of the motors and are provided with the fly wheels 9 at one end and pulleys 10 and 11 at the opposite ends thereof. Both of the motors are of the same type, and as the operating parts are of the same construction, a description of one will serve for both.

On the crank shaft 8 is a sprocket wheel 12 and a drive chain 13 passes around said sprocket wheel and around a similar sprocket 14 upon a stub shaft 15 journaled in brackets 16 connected to the frame bars 2, and by means of a hanger 17 through which the crank shaft 8 passes. Connected to each of the shafts 15 by means of a forked end, is a shifting lever 18 pivoted at 19, and at the opposite end of the shaft 15 is a pinion 20.

The traction wheels 4 are each provided with an annular interior gear 21 extending around the inner side of the rim of the wheel. Secured to each of the stub shafts 5, and located inwardly beyond the traction wheel 4, is a gear wheel 22. The pinion 20 may be shifted to mesh with the gear teeth 21 or to engage and mesh with the gear wheel 22, the latter being mounted to rotate with the stub shaft 5.

Mounted at the rear of the frame is a driver's seat 23. Plows 24 are connected by clevises or pins 25 to the rear ends of the lower bars 1 of the frame, and connecting rods 26 are attached to the plow beams at their lower ends and their upper ends are connected to levers 27 within easy reach of the driver for lifting the plows and securing them in elevated position by means of the curved rack 28.

The front wheels 29 are each journaled in a fork 30 having a stem 31, mounted to rotate in the bars 1 and 2 of the frame. At their upper ends, the stems 31 are bent backwardly as at 32 and provided with spaced lugs 33. The lugs 33 are connected by pins 34 to the opposite ends of a sector rack 35 provided with gear teeth on its upper side. The steering shaft 36 is mounted in a bracket 37, and provided with a hand wheel 38 at its rear end, and at its front end with a pinion 39 which engages the teeth of the sector rack 35. The pinion 39 is held in mesh with the rack 25 by means of a yoke or keeper 40. The sector 35 is mounted upon a cross bar 41 which is pivoted to a central arch 42. A supporting disk or block 43 is disposed between the cross bar 41 and the sector 35.

The operation of the invention will be understood from the foregoing and may be briefly described as follows:

Any suitable implement like a plow or mowing machine may be connected to the traction engine, and it will be understood that either one of the motors may be operated in either direction so that the machine may turn within its length and each of the motors being independently mounted and operated, one wheel may be rotated in one direction and the other wheel in the other direction. The vehicle can be used for various purposes about a farm and can be operated to advantage by a single man.

Various changes and modifications may be made in the details of construction of the machine without departing from the spirit and scope of the invention as defined in the claim.

What is claimed is:—

A traction engine comprising a frame, axles journaled independently in said frame, traction wheels mounted on said axles, gear wheels arranged on each of said axles, each of said traction wheels having an annular interior gear extending around the inner side of the rim thereof, motors mounted on said frame and located one above each of said traction wheels, a shaft extending through each of said motors, a sprocket wheel arranged on each of said motor shafts, hangers connected by their upper ends to each of the motor shafts, stub shafts journaled in the lower ends of said hangers, sprocket wheels carried by said stub shafts, said sprocket wheels carried by the stub shafts being in alinement with the sprocket wheels carried by the motor shaft, a chain trained over the sprocket wheels on each of the motor and stub shafts, gears on the outer ends of said stub shafts, said gears adapted to mesh with the gears which are carried by the traction wheel axles and adapted to mesh with the annular gears on the interior of each of the traction wheels, and means connected to the stub shafts for moving the gears of the stub shafts into and out of engagement with the gears of the traction wheels and traction wheel axles.

In testimony whereof I affix my signature in presence of two witnesses.

HARRY L. WADE.

Witnesses:
ROY CORNETT,
J. F. RITTERBUSCH.

Copies of this patent may be obtained for five cents each, by addressing the "Commissioner of Patents, Washington, D. C."